W. T. WATSON.
WHEEL FOR TOYS.
APPLICATION FILED NOV. 19, 1917.
1,267,724.
Patented May 28, 1918.
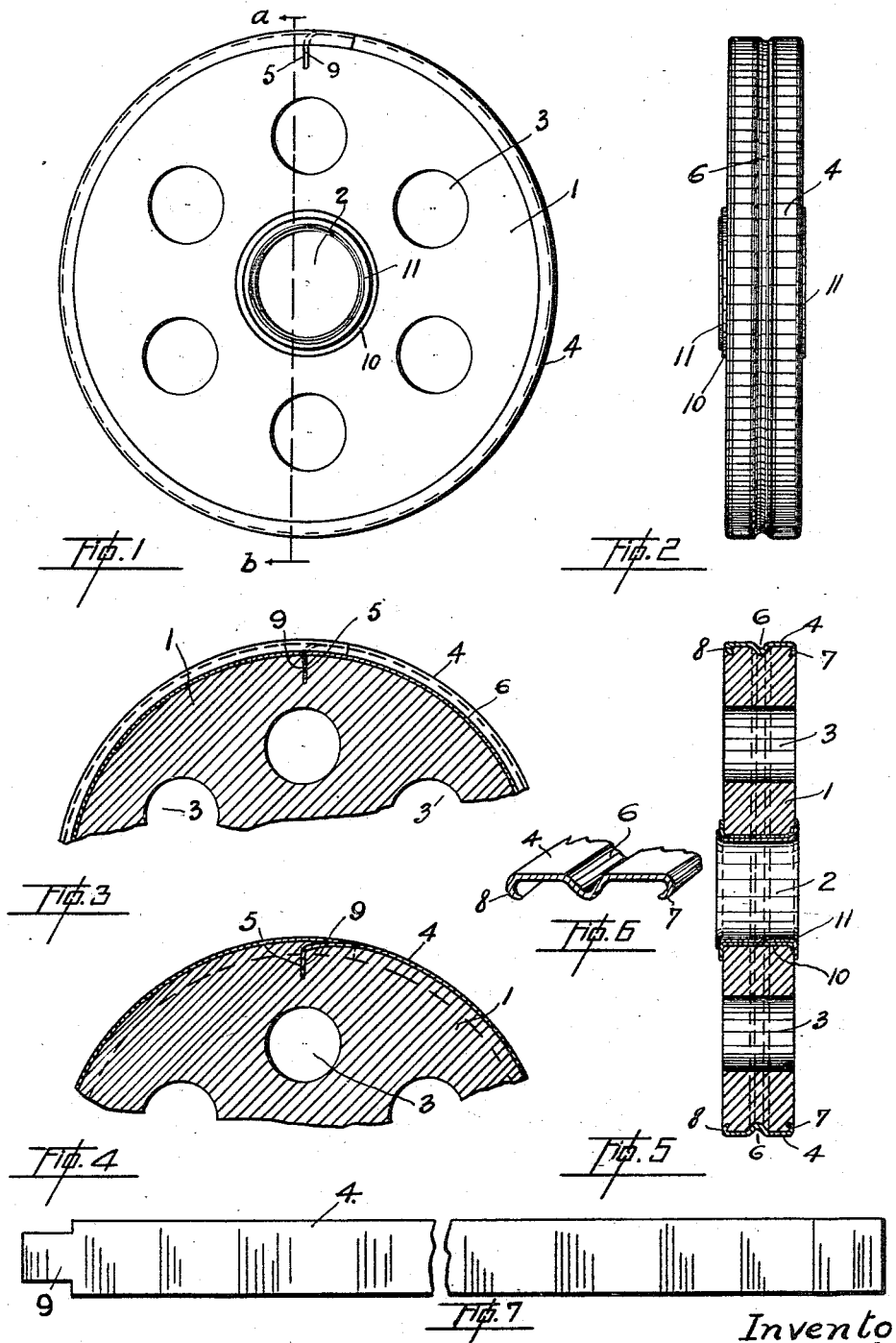
Inventor.
William Thomas Watson

UNITED STATES PATENT OFFICE.

WILLIAM THOMAS WATSON, OF VANCOUVER, BRITISH COLUMBIA, CANADA.

WHEEL FOR TOYS.

1,267,724.	Specification of Letters Patent.	Patented May 28, 1918.

Application filed November 19, 1917. Serial No. 202,798.

*To all whom it may concern:*

Be it known that I, WILLIAM THOMAS WATSON, a subject of the King of Great Britain, and a resident of the city of Vancouver, in the Province of British Columbia, Canada, have invented certain new and useful Improvements in Wheels for Toys, of which the following is a specification.

My invention relates to improvements in wheels for toys, and the object of my invention is to devise a wood wheel provided with a metallic rim adapted to be secured to the periphery of the wheel without the use of nails, glue or any other like means of fastening so as to form, when secured in place, a permanent part of the wheel itself, the use of which rim makes it possible to use, with highly efficient results, practically any kind of cheap wood in the construction of the wheels, thereby doing away with the necessity of using expensive hardwood, as is a common practice at the present time. A further object is to provide a wheel of this character which is capable of being manufactured in a simple, inexpensive, and expeditious manner, and the running of which when in use is rendered practically noiseless on account of the peculiar construction of the metallic rim.

I attain these objects by the construction illustrated in the accompanying drawings in which:—

Figure 1 is a side elevation of the wheel.

Fig. 2 is a front view, looking on the rim.

Fig. 3 is a fragmentary sectional view, taken through the groove of the rim.

Fig. 4 is a fragmentary sectional view, taken through the rim.

Fig. 5 is a cross section of the wheel, taken through the line $a$—$b$ in Fig. 1.

Fig. 6 is an enlarged fragmentary view, in cross section, of the rim.

Fig. 7 is a view showing the metal strip before attachment to the wheel.

Similar figures of reference indicate similar parts throughout the several views.

1 indicates the wood wheel, provided with the usual axle opening 2 and which wheel may be lightened if desired by cutting out of it openings such as indicated at 3 in Fig. 1, or it may be made as a spoked wheel. 4 indicates the metallic rim secured to the periphery of the wheel 1 and which rim, prior to its attachment to the wheel, consists of a flat strip of metal, shown in Fig. 7, of suitable thickness and of sufficient length to encircle the wheel so that one end overlaps the other.

In construction, a cut 5 is made in the periphery of the wheel, which is then placed in a suitable machine capable of rotating it at a desired speed. One end of the strip or rim 4 being reduced in width, as shown at 9 in Fig. 7, and inserted in the cut 5, the machine is set in motion, rotating the wheel in a direction to draw the strip 4 on to its periphery, when suitable appliances with which the machine is provided press the strip downwardly along its peripheral center line so that a groove 6 is formed, at the same time turning the edges of the strip inwardly and sinking them into the sides of the wheel, as indicated at 7 and 8 in Figs. 2, 5, and 6, the wheel being rotated until the strip encircles it so that the other end overlaps the end which was fixed in the cut 5.

The rim thus formed then appears as shown in Figs. 2, 5, and 6, and it will be seen that it is immovably fixed to the wheel, as the grooving of the strip sinks the metal into the wood along the peripheral center line of the wheel so that the wood is thereby spread and crowded, as it were, into the turned over edges of the strip, and the entire operation being effected under pressure, the finished rim is rigidly and securely fastened to the periphery of the wheel and this without the aid of nails, glue, or any other like means of fastening.

Instead of employing the method of attachment described in the foregoing I may prefer to first of all form the rim on a forming wheel on which the rim is formed circular and the edges turned straight inward, thereafter applying the rim so formed to the wheel and then completing the operation by grooving the rim as already described and clenching the edges into the sides of the wheel.

The axle opening 2, while it may be simply a hole formed in the body of the wheel, is preferably fitted with a metallic liner, which consists of thimbles 10 and 11, each of which is flanged at one end, inserted from opposite sides of the opening one within the other and swaged over on each unflanged end so that the unflanged end of thimble 10 is clenched into the body of the wheel and the unflanged end of thimble 11 is turned over on to the flange of thimble 10, from which it will be seen that a double hub sleeve is formed secured to the wheel body without the aid of any separate means of fastening.

What I claim as my invention is:—

1. In a wheel of the character described, a rim having a groove extending circumferentially therearound and sunk into the periphery of the wheel.

2. In a wheel of the character described, a rim having its opposite edges secured to the sides of the wheel and having a groove sunk into the periphery of the wheel.

3. In a wheel of the character described, a single integral metallic rim sunk into the wheel along its peripheral center line and having its edges sunk into the sides of the wheel.

4. In a wheel of the character described, a metallic rim having one end fixed into the wheel and its other end overlapping the fixed end, said rim having a groove formed therein along its peripheral center line and sunk into the wheel and having its edges sunk into the opposite sides of the wheel.

5. A wheel for toys comprising a wheel body, a metallic rim on the periphery thereof the edges of which are turned downwardly and sunk into the sides of the wheel body, the said rim being grooved circumferentially and sunk into the peripheral portion of the wheel to spread the body material on each side of the said groove and draw the sunk edges of the rim inwardly.

6. The method of making wheels for toys which consists in first forming a wooden wheel, fixing thereto one end of a metallic strip of greater width than the wheel thickness, rotating the wheel to draw the said strip thereonto, and then simultaneously sinking the strip into the wheel along its peripheral center line and turning and sinking its edges into the opposite sides of the wheel.

7. The method of making wheels for toys which consists in wrapping under pressure a metal strip around the periphery of a wooden wheel longitudinally grooving the strip, embedding it in the periphery of the wheel thereby forcing the peripheral portion of the wheel outwardly at each side of the center and simultaneously clenching the edges of the strip to the out-pressed sides of the wheel.

8. In a wheel of the character described, a hub sleeve consisting of a pair of thimbles inserted into the axle opening one within the other, said thimbles being flanged at one end and swaged over on their unflanged ends so that the unflanged end of the outer thimble is clenched into the wheel body and the unflanged end of the inner thimble is flanged over on to the flange of the outer thimble.

9. In a wheel of the character described, a metallic rim having one end bent over and inserted into the wheel periphery and its other end overlapping the inserted end, the said rim having its edges clenched into the sides of the wheel.

10. In a wheel of the character described, a metallic rim having one end reduced in width and bent over and inserted into the wheel periphery and its other end overlapping the reduced inserted end, the said rim having its edges clenched into the sides of the wheel so that a continuous clench is formed therearound.

Dated at Vancouver, B. C., this 8th day of November, 1917.

WILLIAM THOMAS WATSON.

Copies of this patent may be obtained for five cents each, by addressing the "Commissioner of Patents, Washington, D. C."